C. B. ROSE.

Bit-Stocks.

No. 6,212.

Reissued Jan. 5, 1875.

WITNESSES.

E. H. Johnson.

J. P. Cranford

INVENTOR.

C. B. Rose

Millers Falls Mfg Co assignee per C. A. Seigniu atty

THE GRAPHIC CO. PHOTO-LITH. 39 & 41 PARK PLACE, N.Y.

UNITED STATES PATENT OFFICE.

CLEMENS B. ROSE, OF SUNDERLAND, ASSIGNOR, BY MESNE ASSIGNMENTS, TO THE MILLER'S FALLS MANUFACTURING COMPANY, OF MILLER'S FALLS, MASSACHUSETTS.

IMPROVEMENT IN BIT-STOCKS.

Specification forming part of Letters Patent No. 63,944, dated April 16, 1867; reissue No. 6,212, dated January 5, 1875; application filed November 17, 1873.

*To all whom it may concern:*

Be it known that CLEMENS B. ROSE, of Sunderland, in the county of Franklin and State of Massachusetts, invented a new and Improved Bit-Stock, of which the following is a specification:

The said invention relates to bit-stocks; and consists in a novel construction and combination of parts, as will be hereinafter more fully described.

Figure 1:
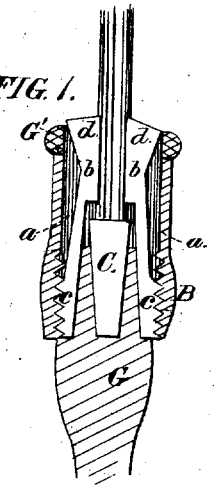
Figure 2:
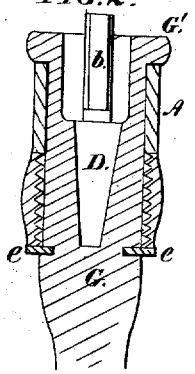
Figure 3:
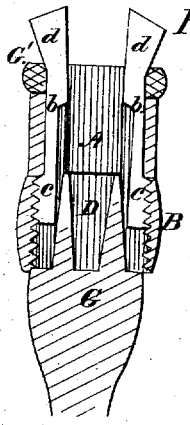
Figure 4:
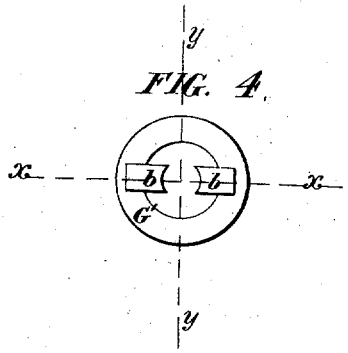
Figure 5:
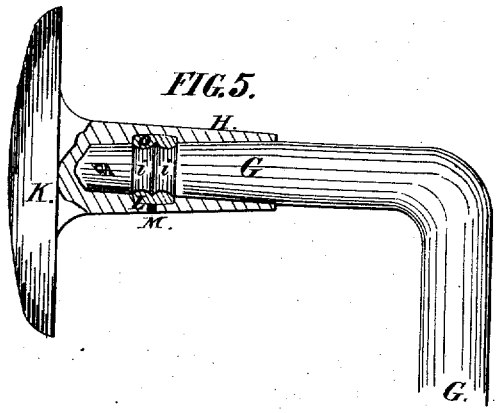

Figures 1 and 3 are longitudinal sectional views of the lower end of the stock, taken on the line *x x*, Fig. 4, which is an end view of the same. Fig. 2 is a similar sectional view, taken on the line *y y* of Fig. 4. Fig. 5 is a side view, with a portion broken away to show the manner of attaching the head of the holder.

In the drawings is shown a stock or holder, G, constructed in the ordinary form of what are technically known as bit stocks or braces. One end of this holder has a head, G′, as shown in Figs. 1, 2, and 3. A circular recess is formed in the central portion of the end of the holder G′, as shown in Figs. 2 and 4, and above this recess is formed a socket, D, having inclined sides adapted to receive the taper tang of a tool, as seen in Fig. 1. A longitudinal groove or recess is cut on opposite sides of the holder, extending from the end to the upper edge of the revolving screw-nut B, as shown in Figs. 1 and 3, the form of these grooves being shown in Fig. 4, with the jaws resting therein. These grooves are cut in the inner surface of the holder for their length, except that portion of the head where the head G′ protrudes sufficiently to form a bearing outside the grooves at that point, as shown in Fig. 4. The ring A is slipped on at the opposite end of the stock G and forced down against the head G′, as seen in Fig. 2, where it is secured in any proper manner to retain its position and thus become part of the head. A revolving nut, B, having a screw-thread cut on its interior surface, is inserted upon the stock and moved against the part A, where it is held by pins *e e* set into the holder G, as seen in Fig. 2, this ring being left so that it will revolve freely on the holder. The jaws *b b* are constructed of the form shown in Figs. 1, 3, and 4. These jaws are screw-threaded on their outer surfaces, to correspond with and work in the revolving screw-nut B, as plainly seen in Figs. 1 and 3. The lower portions of these jaws *b* are made parallel on their inner faces, and are curved or grooved, as shown in Fig. 4, to grasp and hold the tang or spindle portion of a tool, the latter position being shown in Fig. 1. On the outer surfaces, near their lower ends, they are inclined or wedge-shaped, increasing in width toward their outer ends, as seen at *d*, Figs. 1 and 3. These jaws are placed in the longitudinal grooves formed for them in the sides of the holder G within the revolving screw-nut B, and moved up until the threaded portion thereof enters the revolving screw-nut B, when, by rotating the nut, the jaws will be moved longitudinally in the grooves in the holder G and G′, and opened and closed as the nut is rotated in either direction, and, by means of the wedges or inclines *d*, the jaws will grasp or release the tang-shank or spindle of a tool, as will be readily understood.

In Fig. 5 is shown the improved arrangement for attaching the head upon the shaft, forming a bearing for the journal. It consists of a sleeve or socket, H, forming part of or attached to the head K. Into this sleeve the journal *g*, or end of the shaft, fits, and near its end are cut grooves *i i*, and corresponding with these grooves, inside of the socket H, is made a larger groove, L, which extends past on either side of the grooves *i i* in the journal. Through the side of the sleeve, entering into the groove L, a hole, M, is made, and, having placed the journal *g* in the sleeve H, melted metal is poured through the hole M, which fills up the grooves *i i* and L, forming a collar around the journal, which prevents it from coming out, but does not interfere with its revolution.

When the metal or other substance used becomes worn by use, loosening the shaft in its bearing, it can be taken out by melting or other suitable methods, and refilled in the same manner.

In the drawing a section of the metal collar is shown and indicated by the letter O.

The advantages of these arrangements are, a stock is had with a powerful vise for a tool-holder, which is adjustable to any-sized bit, and can be readily loosened or tightened by merely turning the collar around in the direction needed for either operation. Besides this, a bearing is provided for the shaft to turn in, which can always be kept tight-fitting and in order, for as soon as it becomes loosened by the metal being worn away, which only takes place after much use, it can be renewed very readily, and is again tight and in good order.

What is claimed is—

1. The combination of the stock or holder G, having socket D, a longitudinally-grooved head, G′, longitudinally-moving griping-jaws *b b*, having wedge-shaped outer ends *d d*, and a revolving screw-nut, B, constructed and operating substantially as described.

2. The combination of the grooves *i i* in the shaft *g* of stock G, groove L in socket H, with the grooves filled with melted metal, forming the collar O, as and for the purposes specified.

MILLER'S FALLS MANFG. CO.

H. L. PRATT, *Prest.*

Witnesses:

C. A. DURGIN,

J. P. CRAWFORD.